Nov. 20, 1934. F. C. TOWNSEND 1,981,761
AUTOMOBILE HEADLIGHT SHIELD
Filed Feb. 19, 1934
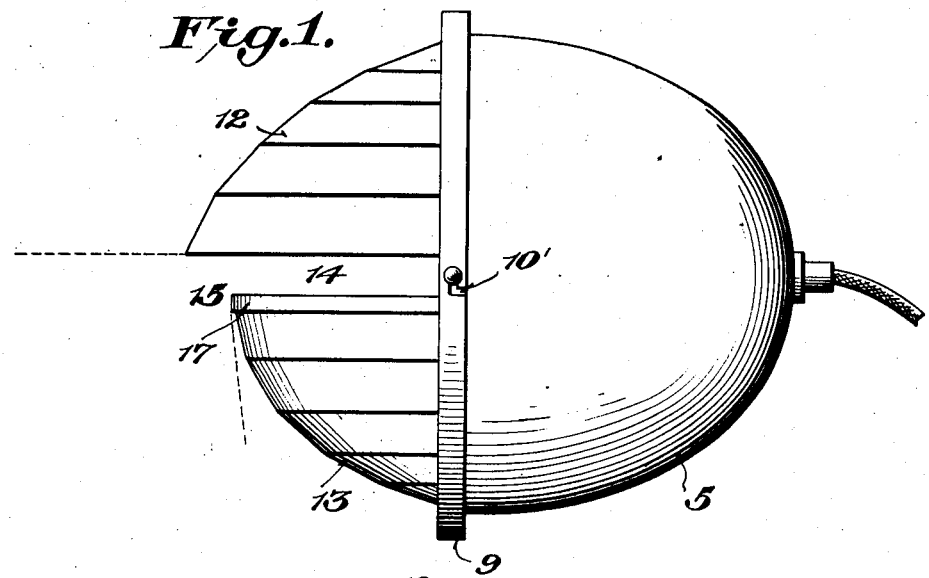
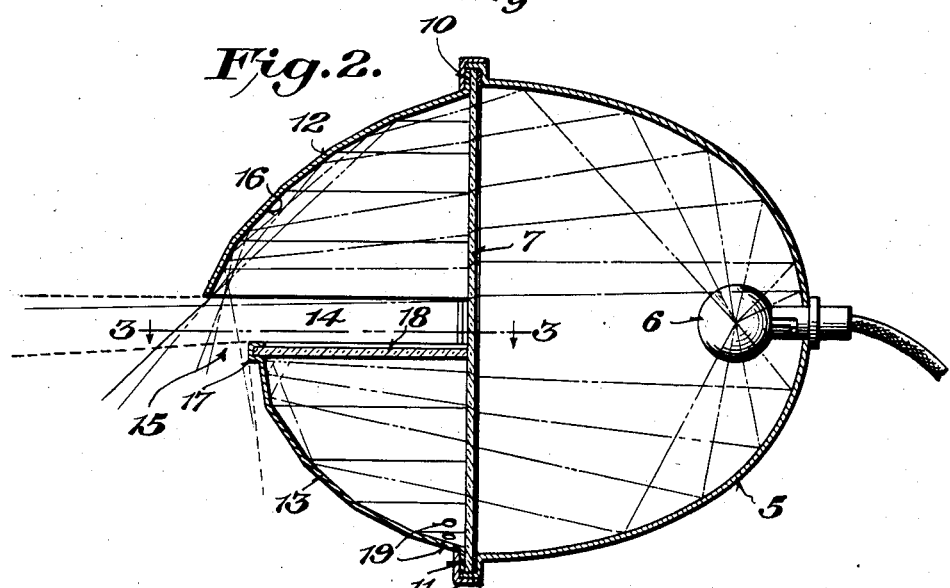
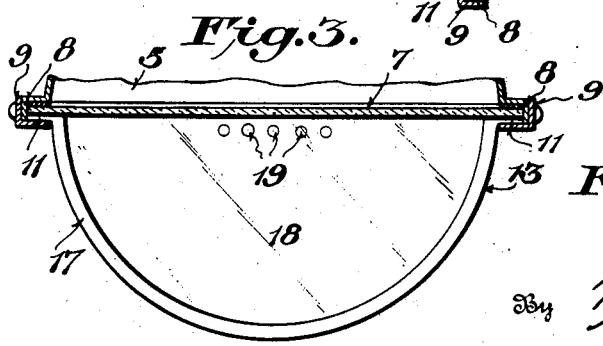
Inventor
Frank C. Townsend,
By Mawhinney & Mawhinney
Attorneys Patented Nov. 20, 1934

1,981,761

UNITED STATES PATENT OFFICE 1,981,761

AUTOMOBILE HEADLIGHT SHIELD

Frank Clark Townsend, Lisbon Falls, Maine

Application February 19, 1934, Serial No. 712,016

3 Claims. (Cl. 240—48.4)

The present invention relates to improvements in anti-glare headlamps for automobiles, and has for an object to provide shield or protector means in conjunction with the forward portions of the headlamps to intercept light rays which are apt to travel upwardly and with great intensity into the eyes of drivers of on-coming vehicles.

The invention also aims to provide improved light shields or protectors which will provide a flood of light directed downwardly in a zone very close to the forward portion of the vehicle, so as not only to illuminate the roadway close to the vehicle for the driver's better visibility, but also to outline the entire front portion of the vehicle to the vision of the drivers of on-coming vehicles whereby suitable clearance will be allowed and accidents avoided.

A further object of the invention is to provide improved light shields or protectors of an inexpensive or simple construction capable of being attached to standard lamp forms without necessitating any alterations therein.

The invention primarily aims to direct light forwardly in a substantially horizontal sheet which will amply and thoroughly illuminate the roadway for a great distance in front of the vehicle to the end that high speeds may be maintained, but in which the rays of light above this horizontal limit will be neutralized or entirely eliminated, whereby the danger of intensive headlight illumination is reduced or entirely eliminated.

With the foregoing and other objects in view, the invention will be more particularly described hereinafter and pointed out in detail in the appended claims.

In the drawing, wherein like reference characters denote similar parts throughout the several views, Figure 1 is a forward elevation of a conventional headlamp showing an improved protector or shield applied thereto in position of use.

Figure 2 is a longitudinal vertical section taken through the same.

Figure 3 is a horizontal section taken on the line 3—3 in Figure 2.

Referring more particularly to the drawing, 5 represents the usual casing of the conventional headlamp, in which is placed the well-known reflector for reflecting light rays from the lamp or source 6 outwardly to and through the glass lens 7. Although ordinarily a separate reflecting member is provided in the casing, I have dispensed with same for clearness in illustration, and have shown the inside surface wall of the casing 5 as being polished to act as the reflecting surface for the light rays. The lens 7, as ordinarily made at the present day, consists in prismatic formations of various kinds intended to refract and condense the light rays received from the reflector for the purpose of intensifying and diffusing the ultimate light beam spreading from the outside of the lens 7.

The edges of the glass lens 7 are ordinarily received within a bead 8 formed on or carried by the forward portion of the lamp casing 5, the lens being held therein by means of a locking ring 9 having a bayonet locking joint 10' with the bead or casing, whereby on a small angular rotation of the ring 9 with reference to the lamp casing, the locking ring 9 may be either freed from, or interlocked with the bead for the purpose of rendering the lens 7 readily detachable and replaceable.

In accordance with the present invention, this locking ring 9 may be utilized to retain the flanges 10 and 11 of the shield or protector members 12 and 13.

The members 12 and 13 are made of metal or some other opaque material which will resist the passage of the light rays, and confine the beam of light issuing from the lamp to the restricted zone left between such members 12 and 13. The members 12 and 13 are preferably of light thin metal of shell-like form, so as not to add any considerable weight to the lamp structure or locking ring 9 and such protectors are preferably in the form of sections of a sphere, each member being approximately a quarter section of a sphere, in which the upper member 12 is appreciably larger than the lower member 13 to the end that the upper member 12 may project to a marked degree in advance of the outer portion of the lower member. There is thus provided between the two members a horizontal gap 14, and forwardly of the forward edge of the lower member 13 a substantially vertical gap 15. Light rays may issue through both said gaps. Moreover, the members 12 and 13 are preferably polished on their interior surfaces to constitute reflectors, and their interior surfaces may also be flattened in horizontally extending terraced bands 16, each band intersecting at an obtuse angle.

The lower shell member 13 is provided at its upper edge with a substantially U-shaped channel 17 to receive the semi-circular edge of a glass, or other light translucent member 18, which extends all the way across the upper portion of the member 13 to the lens 7, to which it may be affixed by appropriate glass adhesive.

In the use of the device, it will be found an easy matter after the locking ring 9 has been removed to apply the two shell-like protector or shield members to the conventional lamp in the positions indicated in the drawing, in which positions they will be retained when the ring 9 is again locked in the customary manner at the bayonet joint 10'. Light rays emanating from the source 6, reflected by the usual reflector, and passing through the lens 7 will be intercepted by the shields 12 and 13, reflected back and forth between its shields, the lens 7 and the internal reflector of the lamp, until such rays as are directed toward the horizontal gap 14 will pass through this gap in a horizontal sheet of light, the upper edge of which will be limited by the lower horizontal edge portion of the usual protector member 12. This edge will be so arranged and disposed that it will prevent direct intensified light beams from passing above too high a horizontal zone such as would cause such intensified beams to be directed into the eyes of drivers of on-coming vehicles. The light zone will be limited by the lower edge of the upper member 12 and by the forward edge portion of the lower member 13 inasmuch as this lower edge portion is set horizontally back from the most forward edge portion of the upper member 12, so that light may descend through the gap 15 in a vertical direction downwardly on the road to thereby intensely illuminate the road directly in front of the vehicle and to cause illumination of the front portion of the vehicle and its consequently sharp definition at night to the drivers of on-coming vehicles. The light rays will extend from a vertical line dropped from the most forward edge portion of the lower member 13 to a horizontal line projecting forwardly from the lower edge portion of the upper member 12, and this sheet or flood of light may penetrate to a great distance forwardly of the vehicle, depending upon the candle power of the light source and the construction of the lamp, but in no case will any intensified light rays or beams be projected on an upwardly inclined angle so as to meet the eyes of drivers of vehicles coming in the opposite direction.

The purpose of the panel or pane of glass 18 is to exclude rain, snow, sleet and the like, and at the same time this panel does not interfere with the reflection of light between the upper and lower shield members. However, this panel or pane 18 is not essential as holes 19 may be made in the lower portion of the lower shield member 13 to permit draining of water therefrom.

The fact that the upper shield extends forwardly of the lower shield will also avoid any light rays being reflected from the reflecting surface of the lower shield upwardly above the horizontal line and into the eyes of drivers of on-coming vehicles.

It will be understood that changes and modifications may be made in the single embodiment of the invention shown in the drawing for illustrative purposes and I reserve the right to make all such changes as come within the scope of the following claims.

What is claimed is:—

1. An improved vehicle headlight lamp comprising a casing, a light source in the casing, a reflector in the casing behind the light source, a lens forwardly of the casing, opaque light shields of partly spherical form projecting forwardly from the casing and lens and being spaced apart to provide a horizontal gap therebetween, the upper shield being set forwardly of the lower shield, and a horizontally disposed glass member closing the mouth of one of said shields, said glass member abutting against said lens.

2. An improved vehicle headlight lamp comprising a casing, a light source in the casing, a reflector in the casing behind the light source, a lens in the forward portion of the casing, opaque light shields of partly spherical form extending forwardly of the casing and lens and being separated to provide a horizontal gap for the issuance of light beams, the lower shield being set backwardly from the upper shield to provide a vertical gap through which light rays may be directed downwardly in a zone close to the front of the lamp, and a horizontally disposed glass member closing the upper mouth of the lower shield and having its inner end abutting against said lens.

3. An improved vehicle headlight lamp comprising a casing, a light source in the casing, a reflector in the casing behind the light source, a lens in the forward portion of the casing, partly spherical oqaque light shields extending forwardly of the lamp casing and lens and being spaced apart horizontally to provide a gap for the issuance of light rays, and a horizontally disposed glass member extending across the upper mouth of the lower shield to prevent the entrance of rain and the like to the space within the lower shield, the inner end of the glass member abutting against said lens.

FRANK CLARK TOWNSEND.